United States Patent
Cech et al.

(10) Patent No.: US 6,829,828 B1
(45) Date of Patent: Dec. 14, 2004

(54) RATCHET BLADE CHANGER FOR HAND PRUNER

(75) Inventors: Michael J. Cech, Madison, WI (US); Carl A. Hoffman, Prairie du Sac, WI (US); Paul Johnson, Cross Plains, WI (US); Jeff Powell, Merrimac, WI (US)

(73) Assignee: Fiskars Brands, Inc., Madison, WI (US)

( * ) Notice: Subject to any disclaimer, the term of this patent is extended or adjusted under 35 U.S.C. 154(b) by 156 days.

(21) Appl. No.: 10/200,913

(22) Filed: Jul. 23, 2002

Related U.S. Application Data

(60) Provisional application No. 60/307,307, filed on Jul. 23, 2001.

(51) Int. Cl.⁷ .............................................. B26B 13/26
(52) U.S. Cl. ........................ 30/250; 30/266; 81/318
(58) Field of Search .................... 30/188, 190, 250, 30/251, 266, 340, 341, 342; 81/60, 61, 62, 63.1, 63.2, 318, 384

(56) References Cited

U.S. PATENT DOCUMENTS

| | | | | |
|---|---|---|---|---|
| 448,363 A | * | 3/1891 | Dixon et al. ................. | 30/239 |
| 1,271,911 A | * | 7/1918 | Kearney ...................... | 81/318 |
| 2,000,852 A | * | 5/1935 | Langbein ..................... | 30/230 |
| 2,816,359 A | * | 12/1957 | Hogue et al. ................ | 30/239 |
| 3,210,844 A | * | 10/1965 | Tontscheff .................. | 30/250 |
| 3,922,783 A | * | 12/1975 | Hayes ......................... | 30/250 |
| 4,055,891 A | * | 11/1977 | Wick ........................... | 30/250 |
| 4,176,450 A | * | 12/1979 | Muromoto .................... | 30/92 |
| 5,697,159 A | | 12/1997 | Lindén ........................ | 30/250 |
| 6,453,561 B1 | * | 9/2002 | Chou .......................... | 30/266 |
| 2001/0003933 A1 | * | 6/2001 | Chi et al. ................... | 81/60 |
| 2002/0062718 A1 | * | 5/2002 | Wang .......................... | 81/60 |
| 2002/0066188 A1 | * | 6/2002 | Wu ............................. | 30/250 |
| 2003/0079576 A1 | * | 5/2003 | Lo ............................. | 81/318 |

OTHER PUBLICATIONS

Tool Shop®, 13 IN 1 Ratcheting Screwdriver (6 pages of photographs).

* cited by examiner

*Primary Examiner*—Hwei-Siu Payer
(74) *Attorney, Agent, or Firm*—Foley & Lardner LLP

(57) ABSTRACT

A pivoted hand tool including a first and second handle, each handle having a jaw member extending therefrom. A pivot connects the first and second handles. A ratchet is operatively engaged with the pivot and at least one of the handles and selectively rotates the pivot in a clockwise and counter-clockwise direction by movement of the handles toward or away from one another.

20 Claims, 6 Drawing Sheets

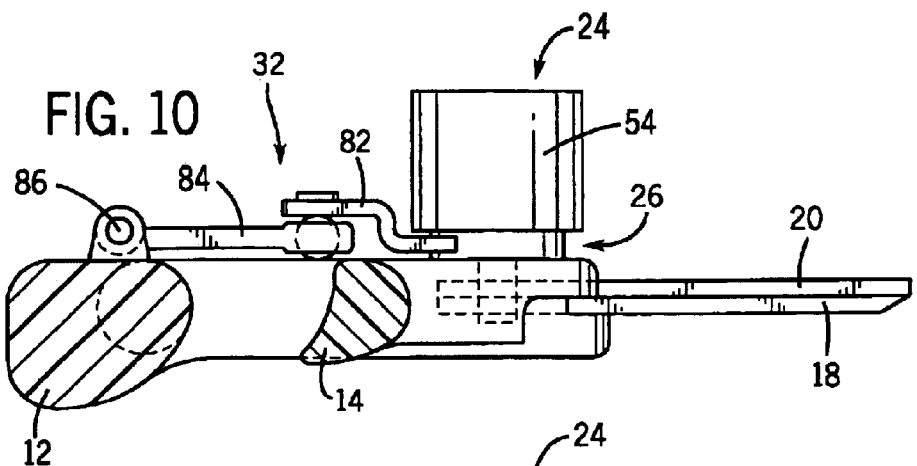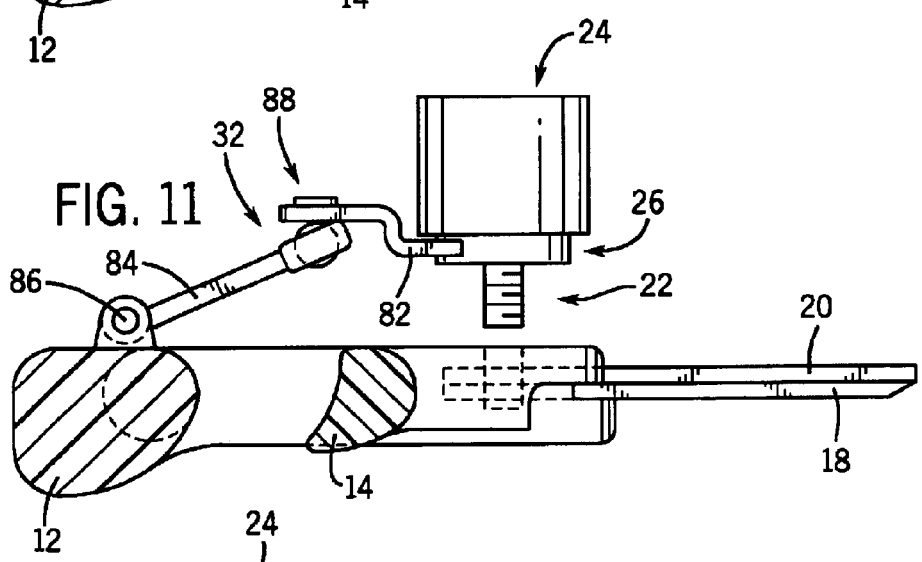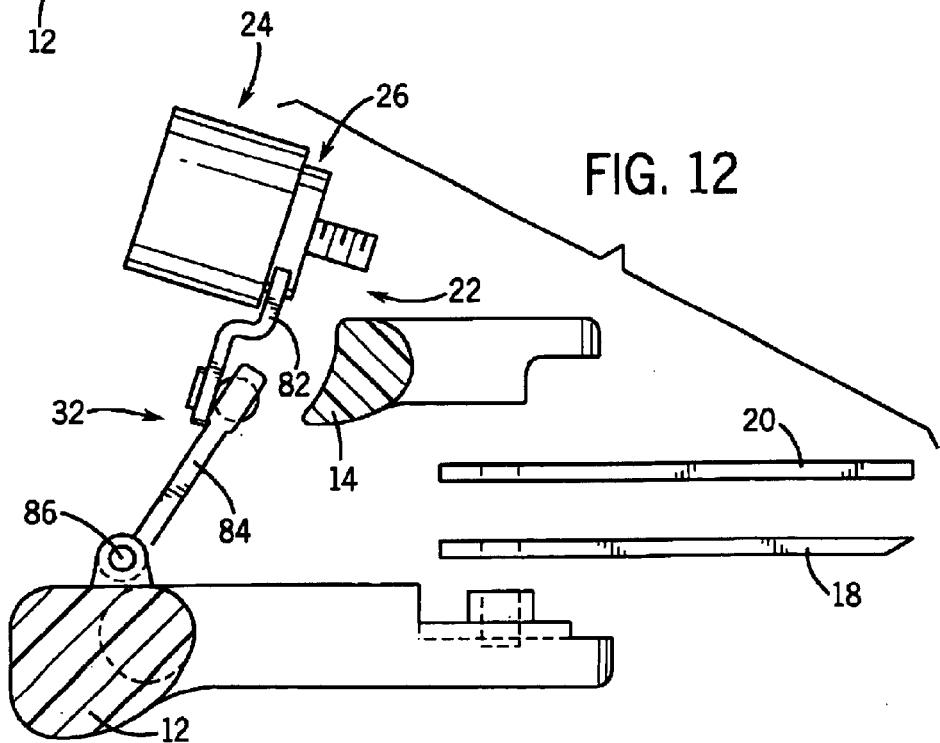

RATCHET BLADE CHANGER FOR HAND PRUNER

CROSS REFERENCE TO RELATED APPLICATIONS

The present application claims priority under 35 U.S.C. § 119(e) from U.S. Provisional Application Ser. No. 60/307,307 entitled "Ratchet Blade Changer for Hand Pruner" and filed on Jul. 23, 2001 by Michael J. Check et al., the full disclosure of which is hereby incorporated by reference.

BACKGROUND OF THE INVENTION

The present invention relates generally to the field of pivoted hand held tools, and more specifically to a ratchet mechanism for adjusting the tension of the blades and for blade replacement of a hand pruner.

Pivoted implements having elongated members disposed for cooperative engagement about a pivotable joint are widely used. In particular tools such as pruning snips generally comprise two elongated members, typically made of stamped or forged metal or other suitable material, disposed for cooperative engagement about the pivotable joint. Typically, each member includes a jaw at the front end portion thereof, an opposed tang, and a pair of handles connected to the tangs.

An improvement to the basic hand pruner is disclosed in U.S. Pat. No. 5,697,159 entitled Pivoted Hand Tool to Linden and is incorporated herein by reference. The '159 patent discloses a hand pruner in which one of the handles is rotatable. A transmission mechanism is provided to inter-convert the rotation force applied to the rotatable handle into a rectilinear force used to draw the handles together.

As a result of wear on the blades and general use of the tool, it may become necessary to replace the blades, or remove them for sharpening and or repair. Additionally, it may be necessary to adjust the tension between the two blades for optimal operation of the pruning tool. However, the removal of the blades or adjustment of the tension requires additional tools that are difficult to carry when working in the field.

It would be desirable to provide a pruning tool that could allow for adjustment of the tension of the blades without the need for external tools. Further, it would be desirable to provide a hand pruning tool that could allow the removal of a damaged blade and installation of new blade in the field without the use of additional tools.

SUMMARY OF THE INVENTION

One embodiment includes a pivoted hand tool including a first and second handle, each handle having a jaw member extending therefrom. A pivot connects the first and second handles. A ratchet is operatively engaged with the pivot and at least one of the handles and selectively rotates the pivot in a clockwise and counter-clockwise direction by movement of the handles toward or away from one another In another embodiment a method for adjusting a pivoted tool includes providing a first and second handle, each handle having a jaw member extending therefrom, the first and second handles being pivotally secured to one another with a threaded pivot threadably engaged with one of the handles. A ratchet assembly is attached to the threaded pivot and the ratchet assembly is linked to the handles. The threaded pivot is tightened by rotating the threaded pivot in one direction relative to the one of the handles by movement of the handles toward or away from one another.

In a further embodiment a hand pruner includes a first and second handle. A first and second blade are operatively secured to the first and second handles. A pivot connects the first and second handles. A three position ratchet is operatively engaged with the pivot and coupled to the first handle with a lever. Movement of the first handle toward and away from the second handle pivots a ratchet gear in a first and second direction about the pivot. The ratchet is adjustable between a first position in which movement of the handle toward the second handle rotates the pivot relative to the handles in a first direction, to a second position in which movement of the handle away from the second handle rotates the pivot in a second direction opposite the first direction. The ratchet includes a third neutral position in which movement of the handles toward and away from one another does not rotate the pivot relative to the handles.

BRIEF DESCRIPTION OF THE DRAWINGS

FIG. 10 is a partial bottom view of the pruning tool with the ratchet in the installed position.

FIG. 11 is a partial bottom view of the pruning tool with the ratchet in the disengaged position.

FIG. 12 is a partial bottom view of the pruning tool with the ratchet, handles and blades in an exploded position.

DETAILED DESCRIPTION OF THE PREFERRED EMBODIMENTS

Figure 1:
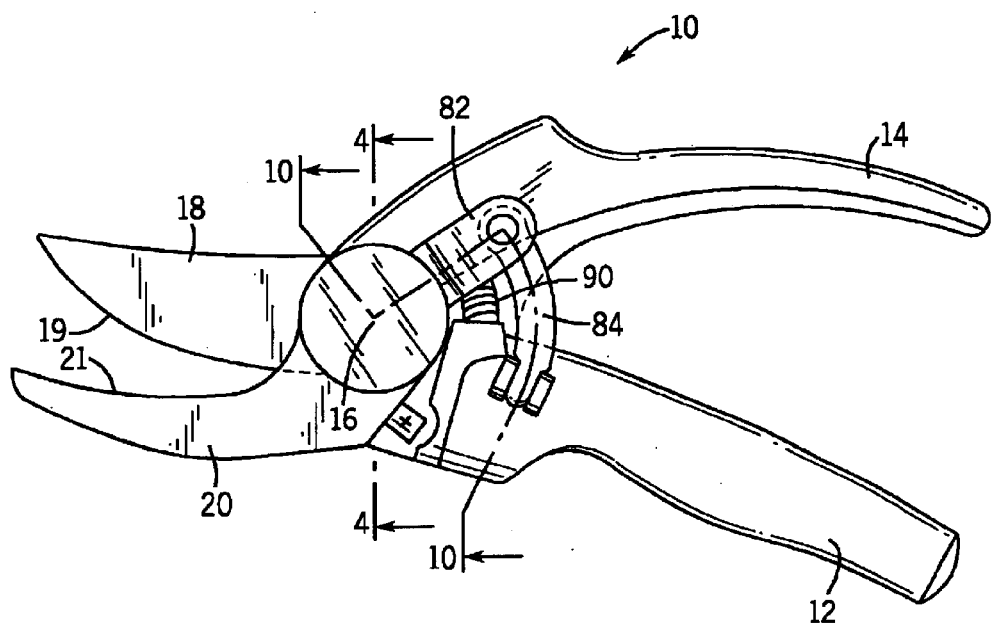
FIG. 1 is a front plan view of the pruning tool in the open position.
Figure 2:
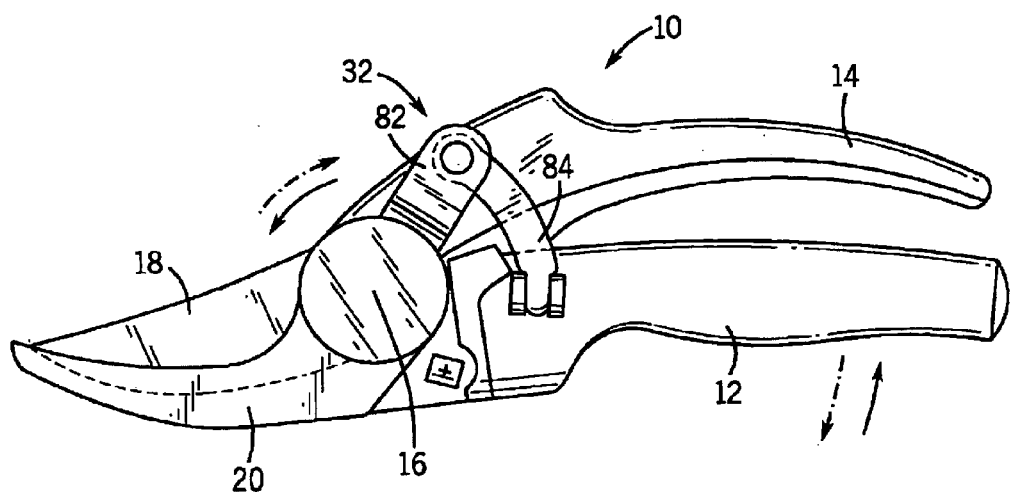
FIG. 2 is a front plan view of the pruning tool in the closed position.

Referring to FIGS. 1 and 2, a pruner 10 includes a first handle 12 and a second handle 14 joined for scissor action about a pivot axis 16. First handle 12 includes a jaw or first blade 18 secured thereto for movement with the first handle 12. Similarly, second handle 14 includes a jaw or second blade 20 secured thereto for movement with the second handle 14. The pruner is shown in the open or extended position in FIG. 1 in which the handles are spread apart and there is space between the cutting or engagement ends 19, 21 of first and second blades 18, 20 respectively. The pruner is shown in the closed or retracted position in FIG. 2 in which the handles are proximate one another and the blades 18, 20 overlap in scissor action.

A threaded member or bolt 22 is threadably attached to the first handle 12 and joins the first and second handles 12 and 14 for movement about pivot axis 16. A ratchet assembly 24 is secured to the threaded member 22 for selectively loosening or tightening the threaded member 22 to the first handle 12. The ratchet assembly 24 includes a ratchet gear 26 selectively engagable with a first and second pawl 28, 30 to either tighten or loosen the first and second blades as will be discussed below. The ratchet gear 26 is attached to the first handle 12 through a linkage 32.

The ratchet assembly 24 is similar to a ratchet mechanism sold with a screwdriver marketed under the trademark Shop Tool® 13 in 1 Ratcheting Screwdriver. The ratchet assembly 24 permits three modes of operation. The first neutral mode permits movement of the handles relative to one another without applying a torque to the threaded member 22. The second mode permits counter-clockwise rotation of the threaded member 22, as the handles are moved toward one another. The third mode permits clockwise rotation of the threaded member 22, as the handles 12, 14 are moved away from one another or from a closed to an open position. It is also contemplated that the ratchet assembly be designed so that the threaded member moves clockwise in response to the handles moving toward one another, and counter-clockwise rotation of the threaded member as the handles are moved away from one another.

Figure 3:
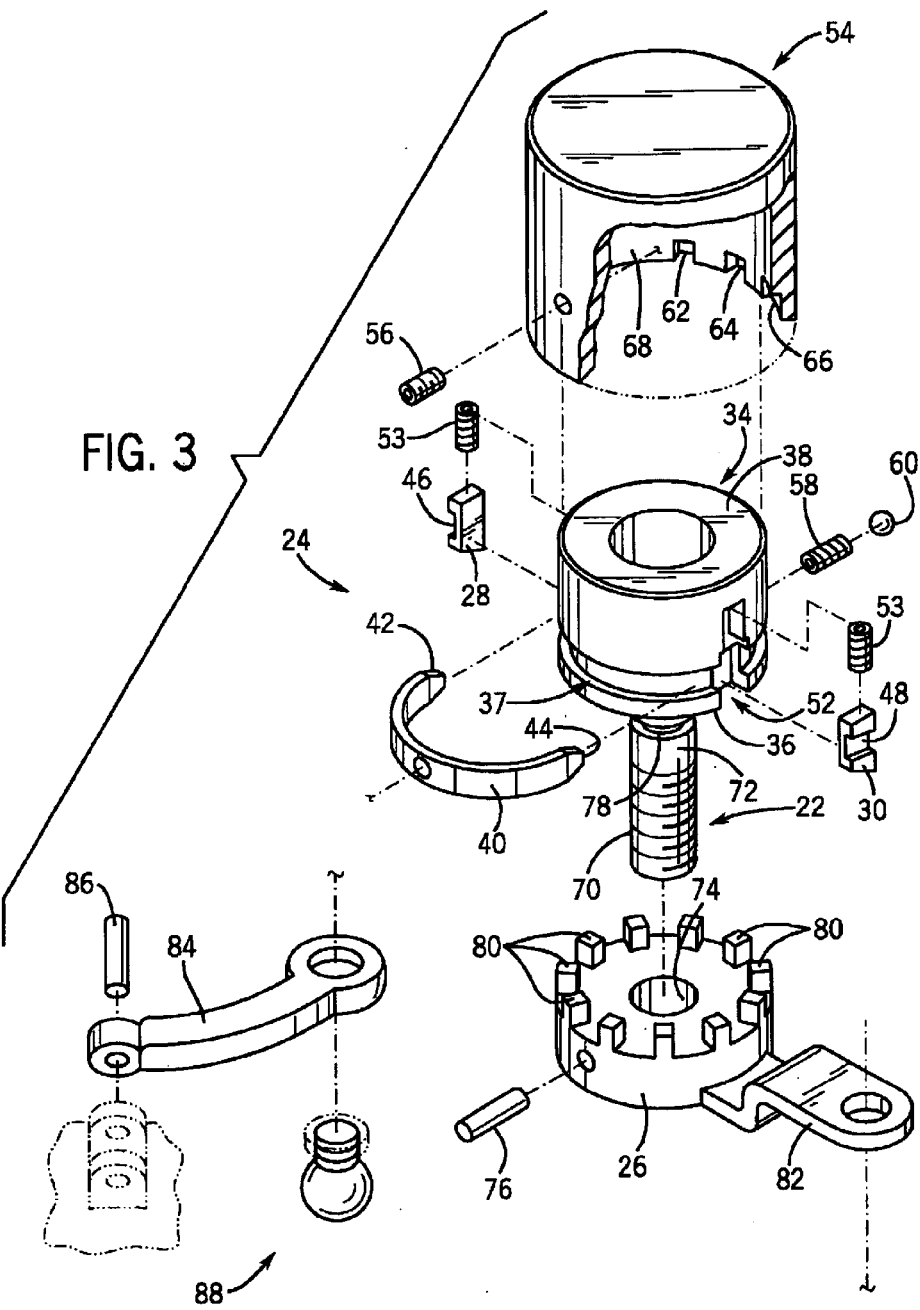
FIG. 3 is an exploded view of the ratchet mechanism.
Figure 4:
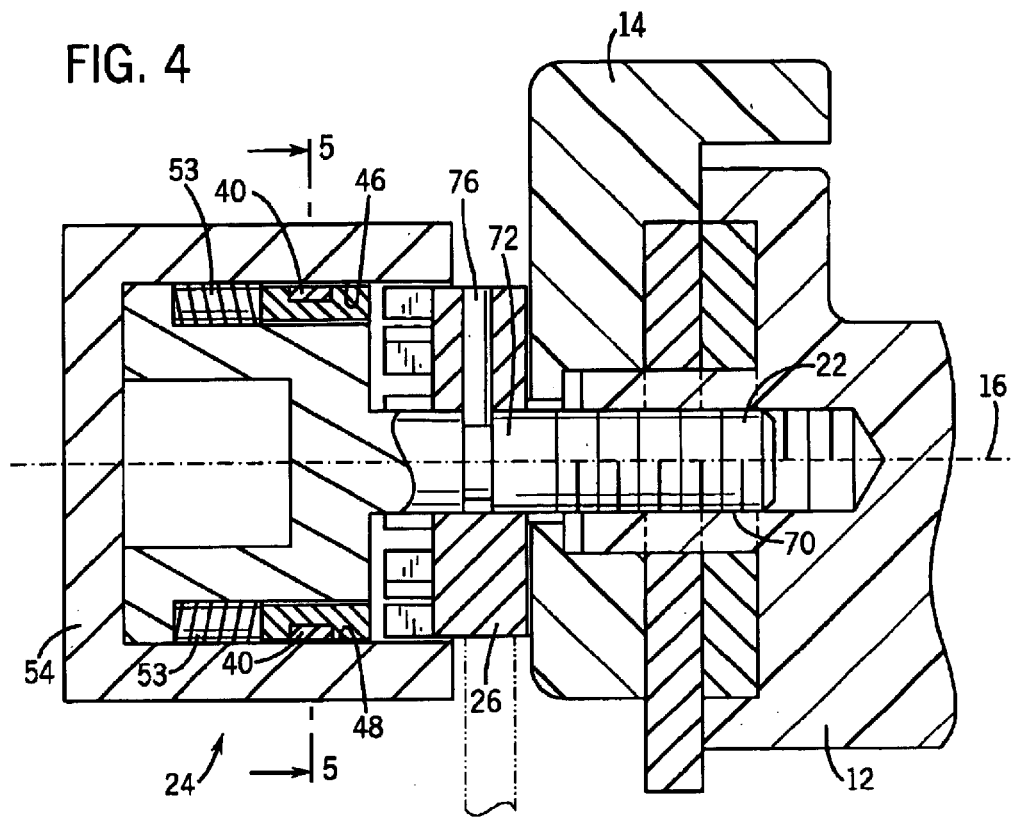
FIG. 4 is fragmentary cross-sectional view of the pruning tools.
Figure 7:
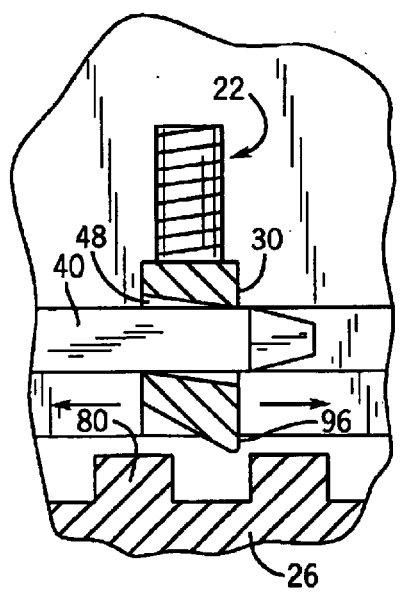
FIG. 7 a fragmentary cross-sectional view of the half ring of the ratchet engaged with a pawl taken generally along lines 7—7 of FIG. 5.
Figure 8:
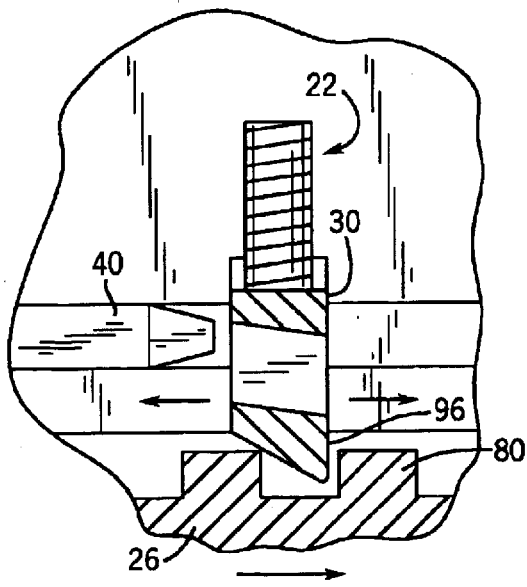
FIG. 8 is a fragmentary cross-sectional view of the half ring of the ratchet disengaged with a pawl taken generally along lines 8—8 of FIG. 6.

Referring to FIGS. 3 and 4 the ratchet assembly 24 will be further described.

A base 34 includes a first end 36 and an opposing second end 38. The base 34 is secured to threaded member 22 proximate the first end 36, such that both the base 34 and the threaded member 22 move together. Base 34 includes a first groove 37 located proximate the first end 36 and slidably receives a half ring 40. Half ring 40 includes two terminal beveled ends 42, 44 that are removably received within a channel 46, 48 of first and second pawls 28, 30 respectively.

Base 34 further includes a pair of channels or grooves 50, 52 extending substantially parallel to the pivot axis of the threaded member 22. A spring 53 is received in each channel 50, 52 to resiliently bias first and second pawls 28, 30 respectively in a direction toward the first end 36 of the base 34 and away from the second end 38 of the base 34. A cap 54 is located over the base 34 and attached to an aperture in half ring 40 with a set screw 56. Rotation of the cap 54 results in rotation of the half ring 40. Base 34 also includes a radially extending channel 57 best illustrated in FIGS. 5 and 6 that receives a spring 58 that resiliently biases a ball 60 into one of three recesses 62, 64, and 66 in the inner surface 68 of cap 54.

Threaded member 22 includes a threaded portion 70 and a bearing surface 72 extending a set distance from the first end 36 of the base 34. The bearing surface 72 of the threaded member 22 permits rotation of ratchet gear 26 about the threaded member 22. Specifically, ratchet gear 26 includes a center opening 74 that receives and pivots about bearing surface 72 of threaded portion 70. A locator pin 76 threadably attached to the ratchet gear is received within a groove 78 located on bearing surface 72.

Ratchet gear 26 includes a plurality of gear teeth 80 that engage pawls 28, 30 to rotate the threaded member upon activation of the handles from the open to closed positions as discussed below. Linkage 32 connects the handles to the ratchet gear, to rotate the ratchet gear about the threaded member 22 upon the opening and closing of the handles. Linkage 32 includes a first lever 82 extending from the ratchet gear 26. A second lever 84 is pivotally coupled to the first handle 12 with a pivot pin 86. The first and second levers 82, 84 are coupled together with a universal ball joint 88.

Figure 5:
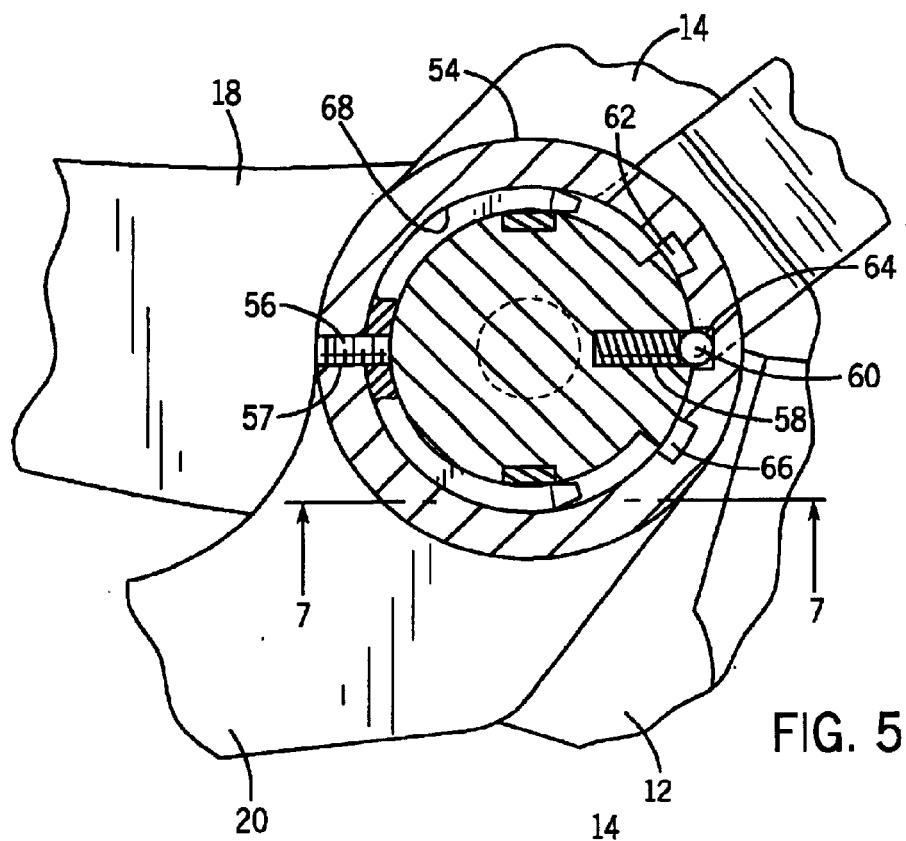
FIG. 5 is a cross-sectional view of the pruning tool taken generally along lines 5—5 of FIG. 4 with the ratchet in a neutral position.
Figure 6:
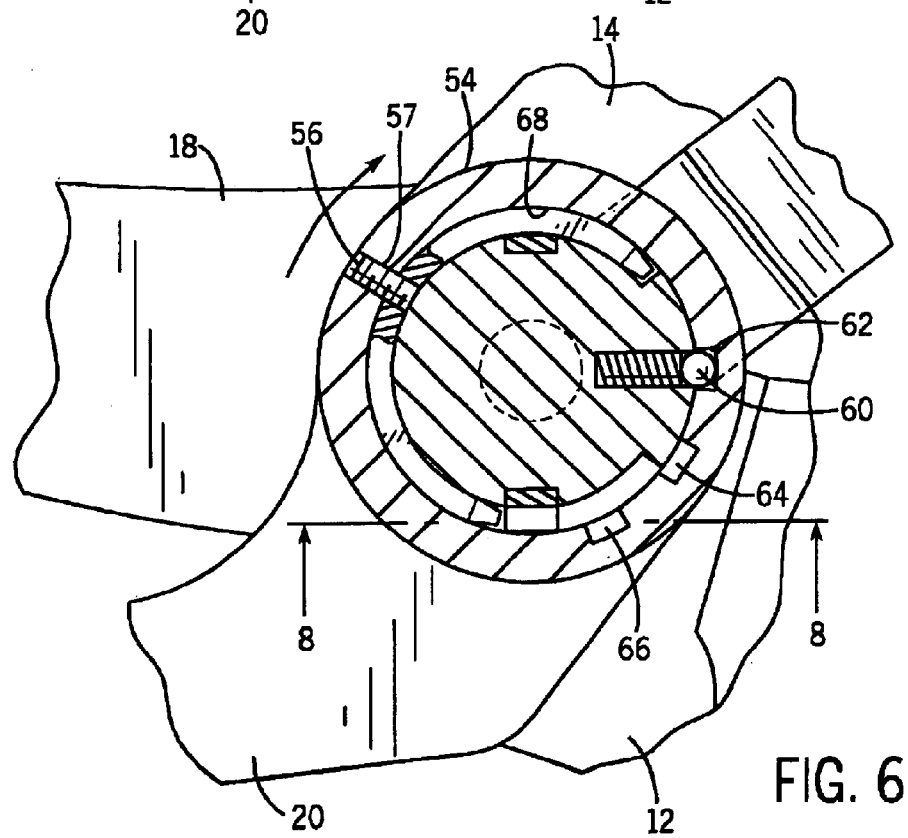
FIG. 6 is a cross-sectional view of the pruning tool taken generally along lines 5—5 of FIG. 4 with the ratchet in a first position.
Figure 9A:
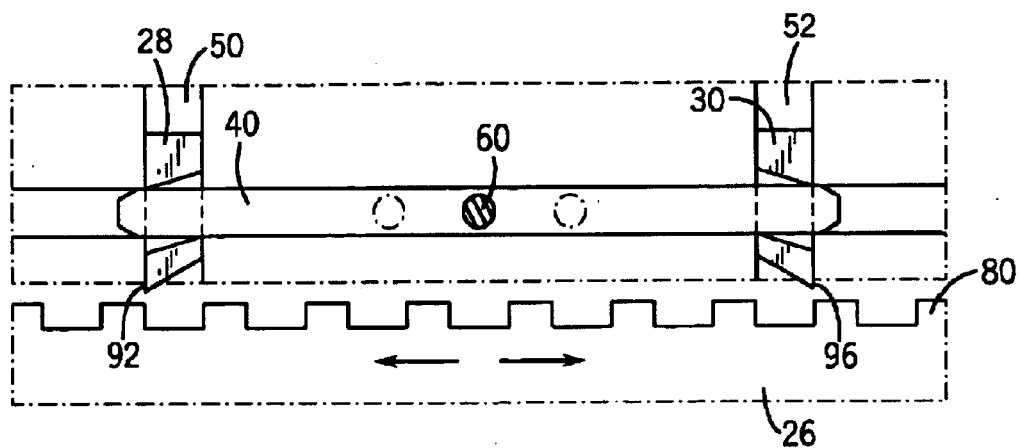
FIG. 9A is a schematic view of the ratchet in a neutral position.
Figure 9B:
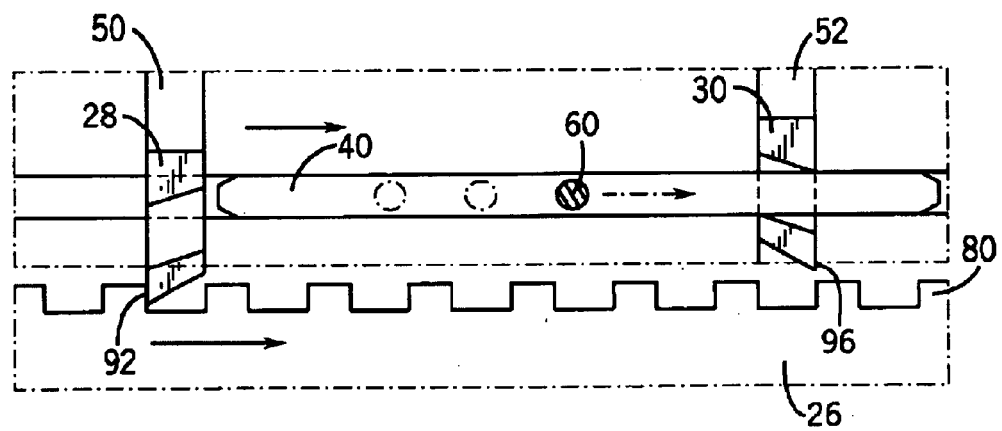
FIG. 9B is a schematic view of the ratchet in a first engaged position.
Figure 9C:
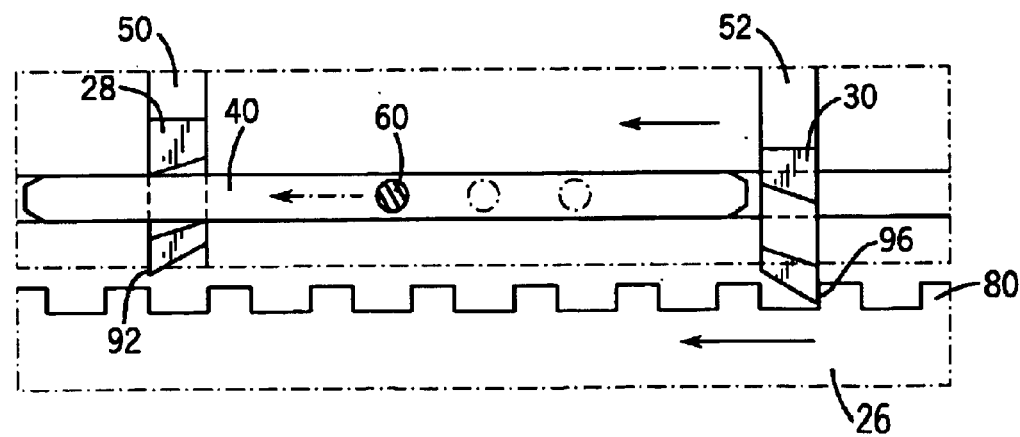
FIG. 9C is a schematic view of the ratchet in a second engaged position.

Referring to FIGS. 5–9A–C the operation of pruner 10 with the ratchet assembly 24 will now be described. Beginning with the pruner 10 in the installed or operating position as illustrated in FIG. 4, the two blades 18, 20 are secured to their respective handles 12, 14. A compression spring 90 resiliently biases the handles 12, 14 to the open position illustrated in FIG. 1. The ratchet assembly 24 is in the neutral position as illustrated in FIGS. 5 and 9A, wherein half ring 40 is positioned to engage both channels 46, 48 of respective pawls 28, 30. The center ring is held in this position by means of the ball 60 being resiliently held in recess 64 thereby fixing the location of the cap 54 and as a result the position of the ring 40. There may be indicia on the cap 54 and base 34 indicating that the ratchet assembly is set in this neutral position. There may also be indicia indicating what mode of operation the ratchet is set.

In this neutral position, the pawls 28, 30 fully clear the ratchet gear teeth 80. This permits the ratchet gear to freely rotate back and forth about the bearing surface 72 of the threaded member 22 as the user is cutting with the pruner 10.

The ratchet gear 26 is rotated about the bearing surface 72 by linkage 32. As first handle 12 is moved toward second handle 14 to effectuate a scissor or cutting motion of the blades, second link or lever 84 drives the ratchet gear 26 through lever 82. Lever 84 is pivotally connected to lever 82 by the universal ball joint 88. When the user wishes to release some of the tension between the blades 18, 20 or to remove one or both of the blades 18, 20 for replacement or repair, the user simply rotates cap 54 in the clockwise direction to rotate the ring 40 out of engagement with first pawl 28. As the cap 54 is rotated, the ball 60 is forced inward toward the pivot until the ball 60 clears the recess 64 and is biased into recess 62. As shown schematically in FIG. 9B, once disengaged from ring 40, pawl 28 is biased downward such that the bottom portion of pawl 28 extends into engagement with the teeth 80 of ratchet gear 26. When the ratchet gear 26 is driven counter-clockwise by movement of the handles 12 and 14 toward one another one of the teeth 80 will contact an engagement surface 92 of pawl 28. As a result the base 34 and threaded member 22 will also rotate counter-clockwise thereby loosening the handle and blade members of the pruner 10. As the handles are resiliently biased away from one another by compression spring 90, the beveled surface 94 of the pawl 28 simply rides over the teeth 80. As illustrated in FIG. 11, by repeated closing of the handles, the threaded member is removed from first handle 12. As the ratchet assembly 24 is removed the movement upward of the first lever relative to the second lever is accommodated by the universal ball joint as illustrated in FIG. 11. Finally, the handles and blades may be disassembled for repair or replacement by simply pivoting the entire ratchet assembly about pivot 86. (See FIG. 12).

The handles 12, 14 and blades 18, 20 may be reassembled or tightened by first rotating the cap 54 in a clockwise direction to move ring 40 such that pawl 30 is disengaged and pawl 28 is engaged. (See FIG. 9C) Additionally, ball 60 is moved from recess 62 to recess 66. In this third position, movement of the handles away from one another causes clockwise rotation of the ratchet gear. An engagement surface 96 of pawl 30 contacts one of the teeth 80 and causes the ratchet assembly and the threaded member to rotate clockwise, thereby tightening the threaded member 22 within the threaded region of the first handle 12. As the handles are moved away from one another the base 34 is moved closer to first handle 12 until the first end or lower side 36 of the base 34 contacts the upper surface of the second handle such that the first and second blades are pressed against one another to provide the scissor action required to use the pruner 10 to cut material such vines, branches, or other materials. In this third mode of operation, when the handles are brought together the beveled portion of pawl 30 engages the teeth which forces the pawl upward in channel 52 until the tooth has passed, after which the spring 53 biases the pawl 30 downward again.

Other ratchet mechanisms may also be used. For example it may be possible to use a ratchet mechanism in which the threaded member may be driven both clockwise and counter-clockwise by movement of the handles toward one another. This may be preferable, since then operation of the ratchet would be the same motion as for using the pruner. This could be accomplished by providing a mechanism that would reverse the counter-clockwise movement of the first lever to clockwise movement of the ratchet assembly and threaded member 22.

It is understood that the above description is of exemplary and preferred embodiments, and that the invention is not limited to the specific forms described. For example, while the preferred embodiment disclosed is for a hand pruner, the concepts may be applied to any tool disposed for cooperative engagement about a pivotable joint. The ratchet could be secured to a lopper, sheers or other similar reciprocating tool about a pivot. Additionally, the ratchet assembly could also be utilized with the pivoted hand tool disclosed in U.S. Pat. No. 5,697,159 having a rotatable handle. The lever could be attached to the rotatable handle with a pivot attachment so long as there is sufficient clearance for the rotation of the handle member. Further, the lever may be attached to the non-rotating handle as well. These and other substitutions, modifications, changes and omissions may be made in the design and arrangement disclosed herein without departing from the scope of the appended claims.

What is claimed is:

1. A pivoted hand tool comprising:
   a first and second handles, each handle having a jaw member extending therefrom;
   a pivot connecting the first and second handles; and
   a ratchet operatively engaged with the pivot and at least one of the handles selectively rotating the pivot in a clockwise and counter-clockwise direction by movement of the handles toward or away from one another.

2. The pivoted hand tool of claim 1, wherein the ratchet is selectively disengagable from the pivot when the handles are moved both toward and away from one another.

3. The pivoted hand tool of claim 2, wherein the ratchet is operatively engaged with the handles with a linkage.

4. The pivoted hand tool of claim 3, wherein the linkage includes a universal joint.

5. The pivoted hand tool of claim 4, wherein the linkage includes a first lever pivotally attached to one of the handles and a second lever attached to the first lever with the universal joint.

6. The pivoted hand tool of claim 5, wherein the pivot includes a threaded portion that is threadably received in one of the handles.

7. The pivoted hand tool of claim 6, wherein one of the handles rotates as the handles are moved toward and away from one another.

8. A method for adjusting a pivoted tool comprising:
   providing a first and second handles, each handle having a jaw member extending therefrom, the first and second handles being pivotally secured to one another with a threaded pivot threadably engaged with one of the handles;
   providing a ratchet assembly attached to the threaded pivot;
   linking the ratchet assembly to the handles;
   tightening the threaded pivot by rotating the threaded pivot in one direction relative to the one of the handles by movement of the handles toward or away from one another.

9. The method of claim 8, further including loosening the threaded pivot by rotating the threaded pivot in an opposite direction relative to the one of the handles by movement of the handles.

10. The method of claim 9, further including setting the ratchet assembly to a neutral position wherein movement of the handles relative to one another does not tighten or loosen the threaded pivot.

11. The method of claim 10, wherein linking the ratchet assembly to the handles includes providing a universal joint between the ratchet assembly and one of the handles.

12. The method of claim 11, wherein linking the ratchet assembly to the handles includes pivotally connecting a bar with one of the handles.

13. The method of claim 10, wherein linking the ratchet assembly to the handles includes pivotally connecting a bar with one of the handles.

14. The method of claim 13, further including rotating one of the handles about its axis as the handles are moved toward and away from one another.

15. A hand pruner comprising:
   first and second handles;
   first and second blades operatively secured to the first and second handles respectively;
   a pivot connecting the first and second handles; and
   a three position ratchet operatively engaged with the pivot and coupled to the first handle with a lever, wherein movement of the first handle toward and away from the second handle pivots a ratchet gear in a first and second directions about the pivot;
   the ratchet being adjustable between a first position in which movement of the first handle toward the second handle rotates the pivot relative to the handles in a first direction, to a second position in which movement of the first handle away from the second handle rotates the pivot in a second direction opposite the first direction, the ratchet including a third neutral position in which movement of the handles toward and away from one another does not rotate the pivot relative to the handles.

16. The hand pruner of claim 15, wherein the pivot includes a threaded region threadably engaged with the first handle, the ratchet being secured to the pivot such that rotation of the pivot and the ratchet in the first direction tightens the threaded pivot in the first handle and increases the pressure between the blades.

17. The hand pruner of claim 16, wherein rotation of the pivot and the ratchet in the second direction loosens the threaded pivot in the first handle and decreases the pressure between the blades.

18. The hand pruner of claim 17, further including a linkage connecting the ratchet with the first handle.

19. The hand pruner of claim 18, the linkage including a universal joint between the ratchet and the first handle.

20. The hand pruner of claim 19, further including a cap being rotatable and selectively setting the ratchet in the first, second or third positions.

\* \* \* \* \*